(12) United States Patent
Trainor et al.

(10) Patent No.: US 9,547,525 B1
(45) Date of Patent: Jan. 17, 2017

(54) DRAG TOOLBAR TO ENTER TAB SWITCHING INTERFACE

(71) Applicant: Google Inc., Mountain View, CA (US)

(72) Inventors: David Andrew Trainor, Sunnyvale, CA (US); Arnaud Claude Weber, Saratoga, CA (US)

(73) Assignee: Google Inc., Mountain View, CA (US)

( * ) Notice: Subject to any disclaimer, the term of this patent is extended or adjusted under 35 U.S.C. 154(b) by 58 days.

(21) Appl. No.: 13/972,815

(22) Filed: Aug. 21, 2013

(51) Int. Cl.
*G06F 3/01* (2006.01)
*G06F 9/48* (2006.01)

(52) U.S. Cl.
CPC ............... *G06F 9/48* (2013.01); *G06F 3/017* (2013.01)

(58) Field of Classification Search
CPC .............. G06F 3/0481–3/0845; G06F 3/0488
USPC ........................................................ 715/777
See application file for complete search history.

(56) References Cited

U.S. PATENT DOCUMENTS

| | | | |
|---|---|---|---|
| 5,644,737 A | 7/1997 | Tuniman et al. | |
| 6,577,330 B1* | 6/2003 | Tsuda et al. | 715/782 |
| 8,826,170 B1* | 9/2014 | Weber | G06F 3/0488 715/777 |
| 2006/0161861 A1* | 7/2006 | Holecek et al. | 715/782 |
| 2006/0277472 A1* | 12/2006 | Yodo et al. | 715/738 |
| 2008/0036743 A1 | 2/2008 | Westerman et al. | |
| 2010/0169772 A1 | 7/2010 | Stallings et al. | |
| 2010/0211872 A1* | 8/2010 | Rolston et al. | 715/702 |
| 2011/0209099 A1* | 8/2011 | Hinckley et al. | 715/863 |
| 2011/0296351 A1* | 12/2011 | Ewing et al. | 715/841 |
| 2012/0060111 A1 | 3/2012 | Kim | |
| 2012/0066628 A1* | 3/2012 | Ens et al. | 715/769 |
| 2012/0131495 A1* | 5/2012 | Goossens et al. | 715/782 |
| 2012/0210270 A1 | 8/2012 | Kwon et al. | |
| 2012/0278756 A1 | 11/2012 | Shah et al. | |
| 2012/0317503 A1* | 12/2012 | Noh et al. | 715/760 |
| 2013/0061159 A1 | 3/2013 | Tseng et al. | |
| 2013/0061160 A1* | 3/2013 | Tseng | G06F 17/30884 715/760 |
| 2013/0145290 A1* | 6/2013 | Weber et al. | 715/760 |
| 2013/0205244 A1* | 8/2013 | Decker et al. | 715/777 |
| 2013/0205304 A1* | 8/2013 | Jeon | G06F 9/4843 718/107 |
| 2013/0212517 A1 | 8/2013 | Liu | |

(Continued)

OTHER PUBLICATIONS

Grazing Browser Features, <URL=http://www.grazingbrowser.com/features.php?device=iphone>; accessed via Wayback Machine, Internet Archive to confirm Dec. 16, 2011 date.*

(Continued)

*Primary Examiner* — Doon Chow
*Assistant Examiner* — James T Tsai
(74) *Attorney, Agent, or Firm* — McDermott Will & Emery LLP (57) ABSTRACT

Aspects of the subject technology relate to switching tabs in an application. A system is configured to provide for the display an application interface. The application interface includes a toolbar and content associated with a first tab from a plurality of tabs open in the application. The system is further configured to receive, via an input device, a swipe gesture on the toolbar in the application interface and enter, in response to the receiving of the swipe gesture, a tab switching mode in the application in which a tab switching interface is displayed on the touch screen.

16 Claims, 9 Drawing Sheets

(56) References Cited

U.S. PATENT DOCUMENTS

| | | |
|---|---|---|
| 2013/0246964 A1 | 9/2013 | Kazawa et al. |
| 2014/0068475 A1 | 3/2014 | Li et al. |
| 2014/0298258 A1* | 10/2014 | Doan .................. G06F 9/4443 715/810 |
| 2015/0058787 A1 | 2/2015 | Trainor et al. |
| 2015/0100552 A1* | 4/2015 | Malis .................. G06F 11/1435 707/650 |

OTHER PUBLICATIONS

Infragistics, "What's new in iOS7? Neither features nor functions, user experience" published Jul. 30, 2013 <URL="http://www.infragistics.com/community/blogs/ux/archive/2013/07/30/what-s-new-in-ios-7-neither-features-nor-functions-but-user-experience.aspx">.*

Martin Brinkmann, "Display Open Tab Count in Firefox" published Dec. 7, 2011, <URL="http://www.ghacks.net/2011/12/07/displayopentabscountinfirefox/">.*

Stack Overflow "Android horizontal swipe top menu," Dec. 2012, retrieved from http://stackoverflow.com/questions/13905606/android-horizontal-swipe-top-menu.

* cited by examiner

DRAG TOOLBAR TO ENTER TAB SWITCHING INTERFACE

FIELD

The present disclosure generally relates to user interface interactions and, in particular, to entering a tab switching interface.

BACKGROUND

Many applications are configured to be able to load content from different sources to be loaded. A user may then switch between the content within an interface provided by the application. For example, a web browser may allow for multiple web pages or other content to be open at the same time by using browser tabs. The content of one of the tabs (e.g., an active tab) may be displayed in an interface (e.g., a window) provided by the web browser. There may also be a tab toolbar showing open tabs in the web browser. To switch between tabs, a user may select a desired tab which causes the web browser to display the contents of the desired tab.

In some cases, space on a screen or on the application interface may be at a premium and the tab toolbar may take up valuable space. Furthermore, for touch screen devices, using the tab toolbar to switch between tabs may be difficult because the tabs shown in the tab toolbar may be small and hard for a user to select using the user's finger or a stylus.

SUMMARY

Aspects of the subject technology relate to a system for entering a tab switching interface in an application. The system includes one or more processors and a machine-readable medium comprising instructions stored therein, which when executed by the one or more processors, cause the one or more processors to perform operations. The operations include providing for the display an application interface, the application interface comprising a toolbar and content associated with a first tab from a plurality of tabs open in the application, receiving, via an input device, a swipe gesture on the toolbar in the application interface, and entering, in response to the receiving of the swipe gesture, a tab switching mode in the application in which a tab switching interface is displayed on the touch screen.

Additional aspects of the subject technology relate to a computer-implemented method for entering a tab switching interface in an application. The method includes displaying an application interface on a touch screen, the application interface comprising a toolbar and content associated with a first tab from a plurality of tabs open in the application, receiving, on the touch screen, a swipe gesture on the toolbar for the application, and entering, in response to the receiving of the swipe gesture, a tab switching mode in the application in which a tab switching interface is displayed on the touch screen.

Aspects of the subject technology may also relate to a non-transitory machine-readable medium comprising instructions stored therein, which when executed by a machine, cause the machine to perform operations for entering a tab switching interface in an application. The operations include displaying a browser interface on a touch screen, the browser interface comprising an address toolbar and content associated with a first tab from a plurality of tabs open in a web browser, receiving, on the touch screen, a swipe gesture on the address toolbar in the application interface, and entering, in response to the receiving of the swipe gesture, a tab switching mode in the application in which a tab switching interface is displayed on the touch screen.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Various aspects of the subject technology relate to entering a tab switching mode by dragging a toolbar down on a touchscreen display. Before entering the tab switching mode, a system is configured to show an application interface with a toolbar on a display device, such as a touch screen. The application may be, for example, a web browser and the web browser's interface may contain the toolbar in the form of an address bar where users may view or enter a uniform resource locator (URL).

The system is further configured to enable a user to enter a tab switching mode by using a swiping gesture on the toolbar to drag the toolbar downward. The swipe gesture may include, for example, swiping a finger or a stylus across a toolbar displayed on a touch screen or other touch-sensitive device. In the tab switching mode, a tab switching interface may be displayed on the touch screen.

The tab switching interface may be configured to allow the user to view and select one of the tabs open in the application. For example, the tab switching interface may appear as a deck or stack of "cards" where each card corresponds to a tab and displays a representation of the contents of the corresponding tab. Once a selection of a tab is made, the system exits the tab switching mode and returns to an application interface showing the selected tab.

By providing the user with a means to display the tab switching interface by using a swipe gesture to drag a toolbar (e.g., an address toolbar) down, other user interface components used for switching tabs do not need to be displayed, thus saving space for other content (e.g., web page content or other application interface components) or allowing existing content to be enlarged. Furthermore, whether or not other interface elements for switching tabs are displayed, providing the tab switching interface in response to a user dragging the toolbar down provides a convenient method for switching tabs.

Figure 1:
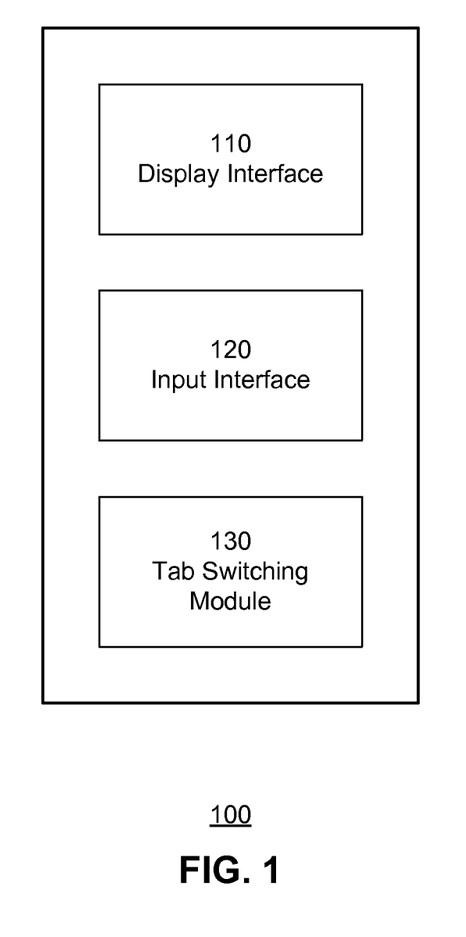
FIG. 1 is a block diagram illustrating an example computing device configured to switch tabs in an application, according to various aspects of the subject technology.

FIG. 1 is a block diagram illustrating an example computing device 100 configured to switch tabs in an application, according to various aspects of the subject technology. The computing device 100 may be, for example, a mobile device (e.g., a smart phone, a global positioning system device, or a tablet computer), a laptop, a desktop computer, a gaming console, a smart television or other appliance, a set top box, or any other computing machine capable of running an application. The application may include, for example, a web browser, a content (e.g., image or video) viewer application, a text or image editor, or any other application that can load multiple tabs of content.

The computing device 100 may include a display interface 110, an input interface 120, and a tab switching module 130. However, in other aspects components may be removed, additional components may be added, or alternative components may be used. In some implementations, the modules or interfaces may include instructions encoded in a non-transitory medium and executed by a processor, computer hardware components, or a combination of both. The components may each also include one or more processors or memories that are used to perform the functions described below or share one or more processors or memories.

The display interface 110 may be configured to manage the display of content on a display device connected to or in communication with the computing device 100. For example, the display interface 110 may be configured to display an application interface on a display device (e.g., a touch screen, a monitor, etc.). The application interface may be displayed in the entire display area for the display device or on a portion of the display area. The application displayed may support a number of open tabs and appear on the display device showing a toolbar (e.g., the address toolbar for a web browser) and content associated with one of the supported tabs.

The input interface 120 is configured to receive user input signals from one or more input devices connected to or in communication with the computing device 100. In some case the input device and the display device may be a part of the same device (e.g., a touch screen device). Although some aspects of the subject technology are discussed with respect to a touch screen input device, other touch-sensitive input devices (e.g., a touchpad or a touch-sensitive display) and other input devices (e.g., a mouse, game controllers, or gyroscopic devices) that can simulate swipe gestures may also be used with an application running on a computing device.

For example, the input interface 120 may receive, from an input device, an indication of a swipe gesture at a location corresponding to the toolbar of the application. In some cases, this swipe gesture may be in a direction that is perpendicular to the length of the toolbar. For example, if the toolbar is horizontally oriented at the top of the application interface, a user may make a swipe gesture in a downward direction starting from the toolbar location.

In response to receiving the swipe gesture, tab switching module 130 may be configured to allow the toolbar to be dragged downward by the user's swipe gesture. As the toolbar is dragged down, the tab switching module 130 may enter a tab switching mode and display a tab switching interface. The tab switching interface enables a user to view tabs that are open in the application and to select a tab to view. In some variations, a preview of the contents of one or more tabs may be shown in the tab switching interface. The user may select a tab to view and, in response to receiving the user selection of a tab, the tab switching module 130 may cause the contents of the selected tab to be displayed in the application interface.

Figure 2A:
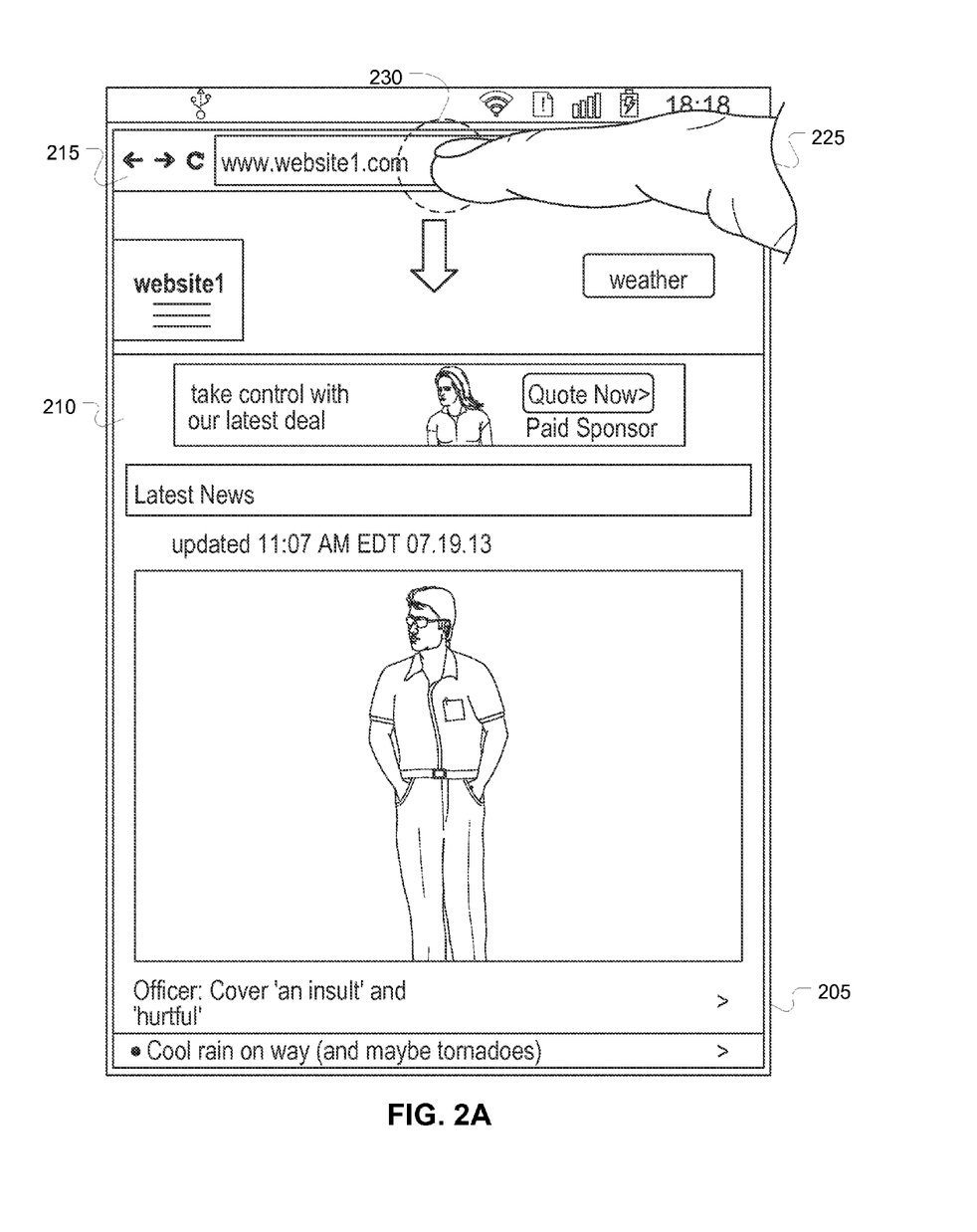
FIG. 2A, FIG. 2B, and FIG. 2C are diagrams illustrating an example scenario where an application interface displays a tab switching interface in response to receiving a swipe gesture on a toolbar, in accordance with various aspects of the subject technology.
Figure 2B:
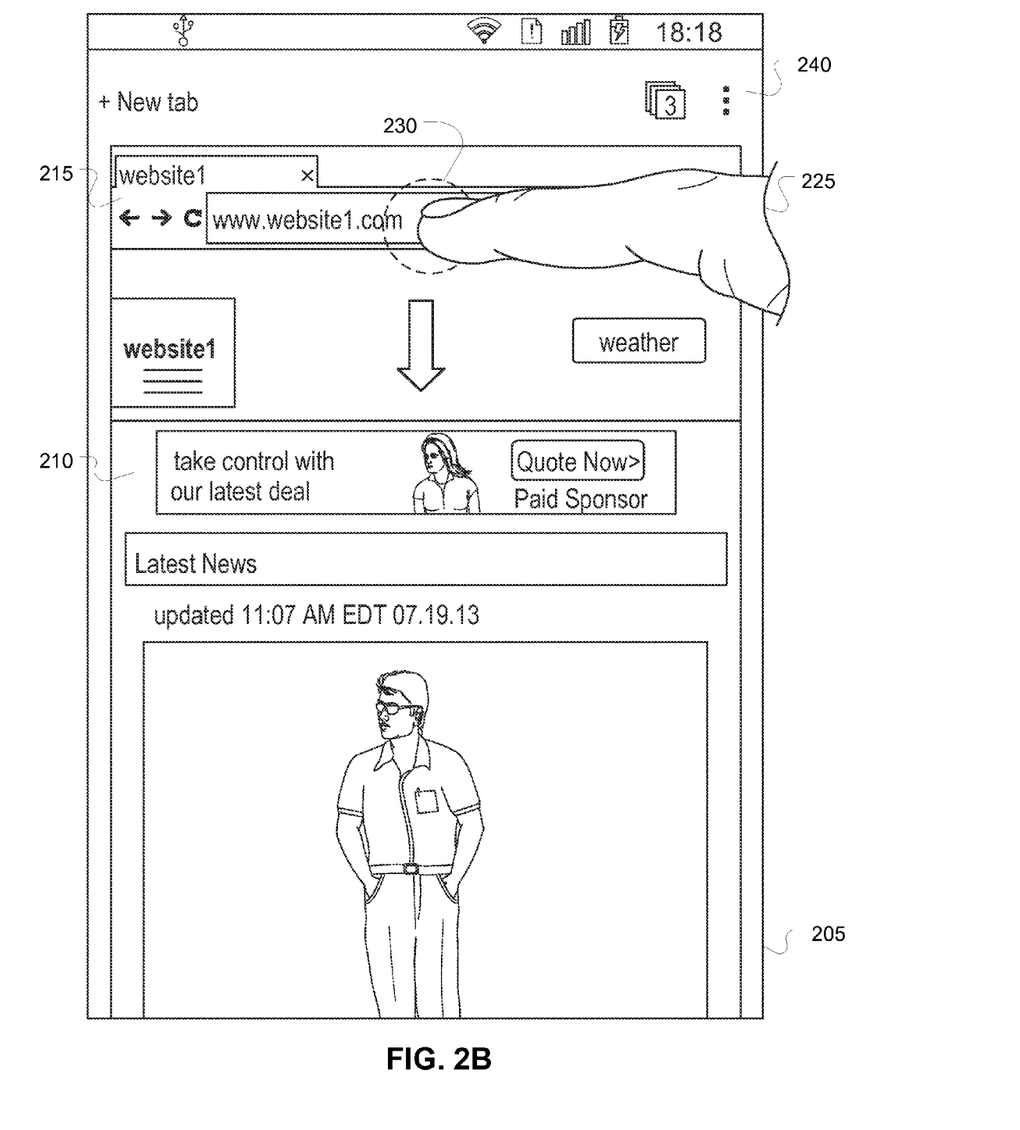
Figure 2C:
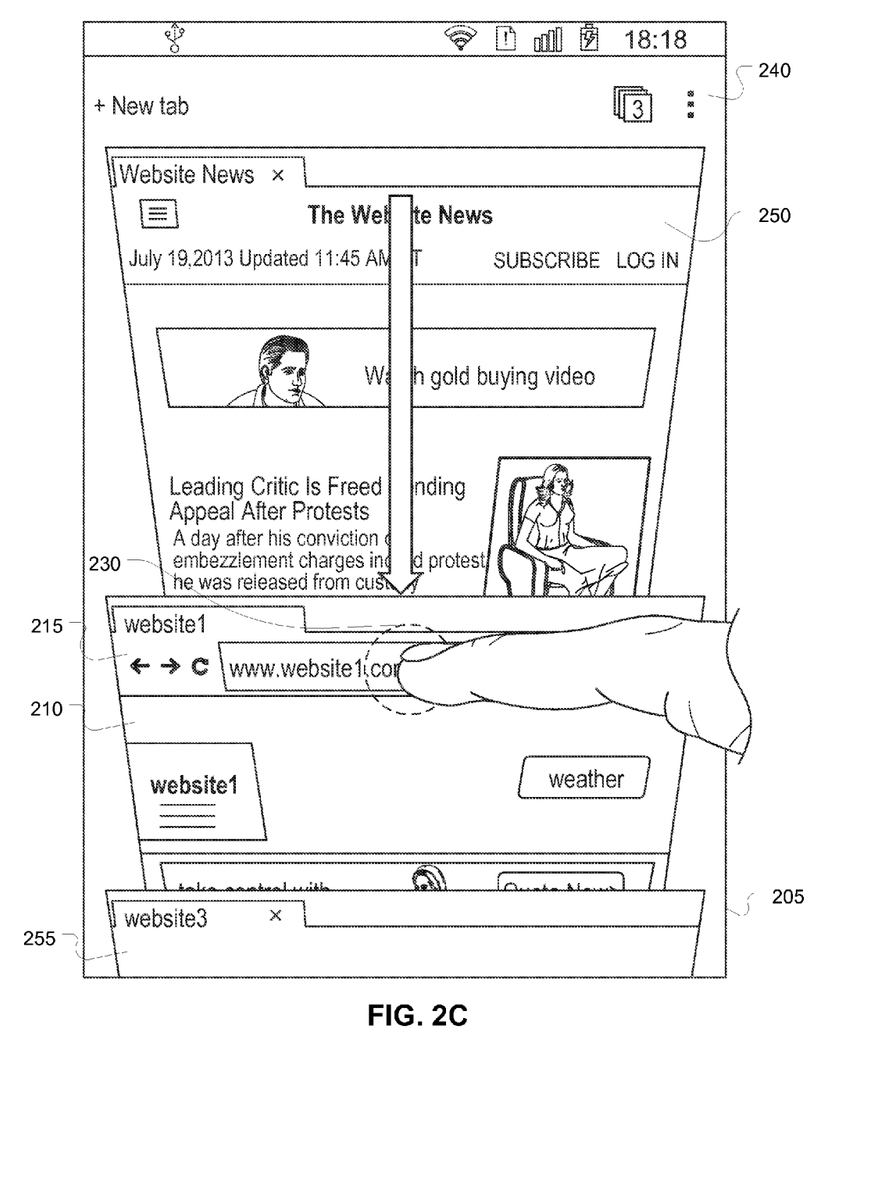

FIG. 2A, FIG. 2B, and FIG. 2C are diagrams illustrating an example scenario where an application interface 205 displays a tab switching interface in response to receiving a swipe gesture on a toolbar, in accordance with various aspects of the subject technology. FIG. 2A shows an application interface 205 in the form of a web browser displayed on a touch screen. The application interface 205 may correspond to an application in which multiple tabs are open, however only the content of one tab 210 is shown in the application interface 205.

A toolbar 215 is displayed in the application interface 205 and is configured to receive and display the location or source of the content loaded in the displayed tab 210. For example, in FIG. 2A, the toolbar 215 is an address toolbar for the web browser that displays a uniform resource locator (URL) field. In particular, the address toolbar indicates that the content for the currently active tab 210 is from the URL "www.website1.com."

Some web browsers display a tab toolbar or other user interface component near the top of the web browser that allows a user to switch between tabs or that provides an indication of the available tabs. Although multiple tabs may be open in the application, in accordance with some aspects, the application interface 205 displayed on the touch screen does not display any other user interface component that provides an indication of the open tabs. Nor is any other user interface component displayed that allows a user to switch between tabs. Instead, the user may switch tabs by using a swipe gesture on the address bar 215. As a result, the space saved from not needing to display these additional user interface components may be used for other content. In other aspects, however, a tab toolbar may also be displayed.

As seen in FIG. 2A, a user may initiate a swipe gesture 230 by making contact with the touch screen with a finger 225 (or stylus) and moving the finger 225 while still maintaining contact with the touch screen. Although the swipe gesture 230 in FIG. 2A is a vertical (e.g., downward) swipe gesture, in other aspects, horizontal swipe gestures or other swipe gestures may also be used. Furthermore, although the toolbar is positioned horizontally at a top portion of the application interface, the toolbar may also be oriented in a different manner (e.g., vertically).

As mentioned above, the tab switching module 130 may enter a tab switching mode in which a tab switching interface is displayed. As the swipe gesture 230 on the toolbar 215 occurs in FIG. 2A, the address toolbar 215 is dragged downward along with the content loaded in the tab 210, as can be seen in FIG. 2B. As the address toolbar 215 and the content loaded in tab 210 are dragged downward, a previously unseen tab utility interface 240 may appear in the application interface 205. The tab utility interface 240 may include interface elements configured to enable a user to add a new tab, view how many tabs are open in the application, open a tab selection interface, or perform other functions associated with the tabs open in the application.

As the swipe gesture 230 on the toolbar 215 continues in FIG. 2B, the tab switching module 130 may enter a tab switching mode and a tab switching interface may be displayed in the application interface 205. The tab switching interface enables a user to view tabs that are open in the application and to select a tab to view. In some variations, a preview of the contents of one or more tabs may be shown in the tab switching interface.

For example, in FIG. 2C, a tab switching interface is displayed in the application interface 205. The tab switching interface includes a visual representation of the tabs that are open in the application (e.g., tabs 210, 250, and 255) and, in particular, a preview of the contents of each tab. The tab switching interface is configured as a series of cards that may be "flipped" through as the user continues his scroll gesture or makes new scroll gestures. The tab switching interface may show the open tabs as a rolodex of cards that may be scrolled through vertically, however, in other aspects, other visual representations of the open tabs may also be used.

When the tab switching interface is displayed in the application interface 105, the tab switching module 130 may receive additional input (e.g., touch input) to scroll through open tabs or a user selection of a tab that the user would like to switch to. For example, the user may continue his downward swipe gesture to scroll through available tabs or make new swipe gestures upwards or downwards to scroll through available tabs. To select a tab, the user may tap or double tap the desired tab. In response to receiving the user selection, the tab switching module 130 may exit the tab switching mode and cause the contents of the selected tab to be displayed in the application interface 205.

According to some aspects, the address bar may follow the path of the swiping gesture along the vertical plane and remain attached to the tab that was displayed in the application interface 205 when the swipe gesture was initiated. A user may also change directions of the swipe gesture to exit the selection interface. For example, if the user does not wish to switch tabs, the user may reversing the downward swiping gesture and bring the swipe gesture upwards to place the address bar back to its previous position at the top of the display position.

Although the swipe gesture 230 discussed with respect to FIGS. 2A-2C are generally vertical, other swipe gestures (e.g., horizontal or a combination of different directions) may also be used. For example, FIG. 3A, FIG. 3B, and FIG. 3C are diagrams illustrating an example scenario where an application interface 305 displays a tab switching interface in response to receiving a swipe gesture on a toolbar, in accordance with various aspects of the subject technology.

Figure 3A:
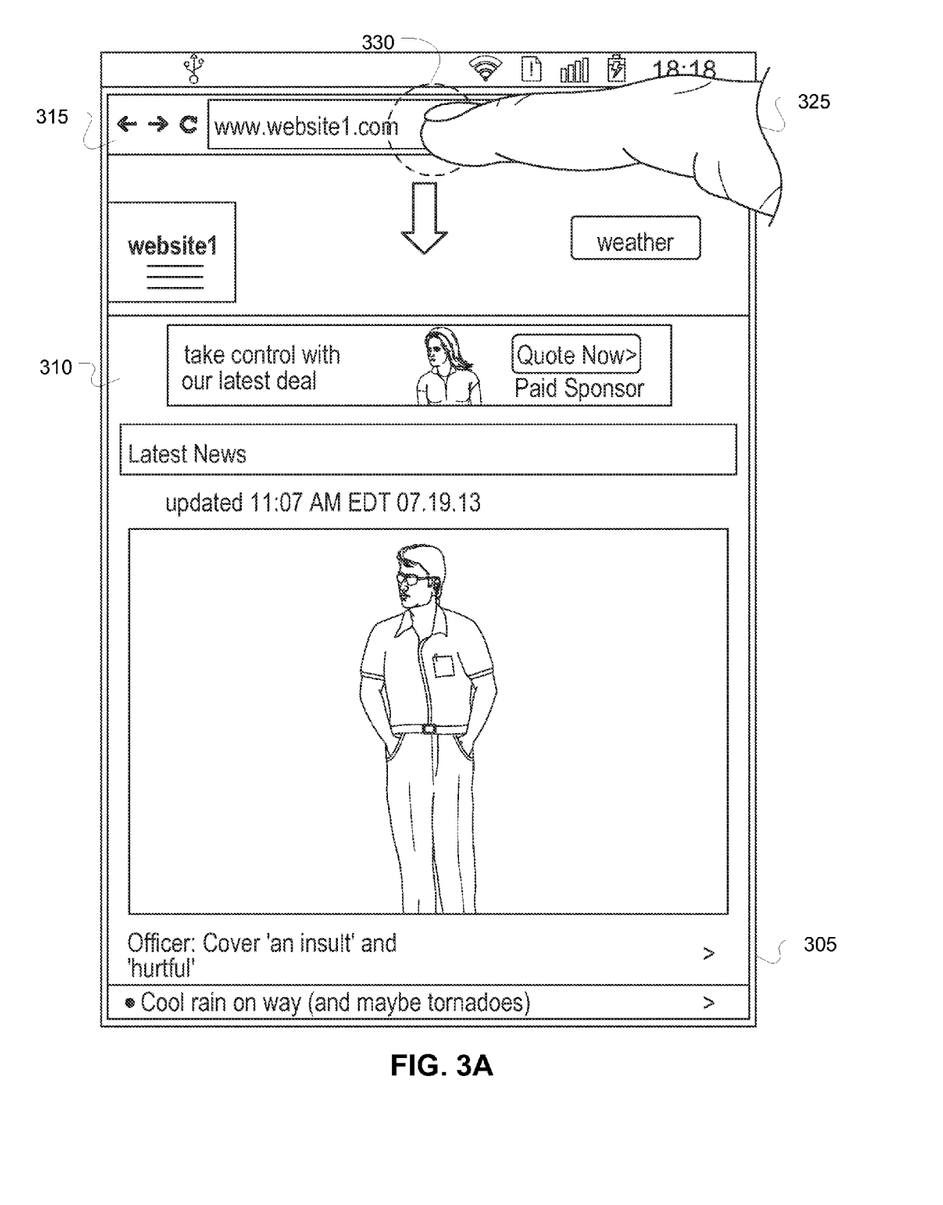
FIG. 3A, FIG. 3B, and FIG. 3C are diagrams illustrating an example scenario where an application interface displays a tab switching interface in response to receiving a swipe gesture on a toolbar, in accordance with various aspects of the subject technology.
Figure 3B:
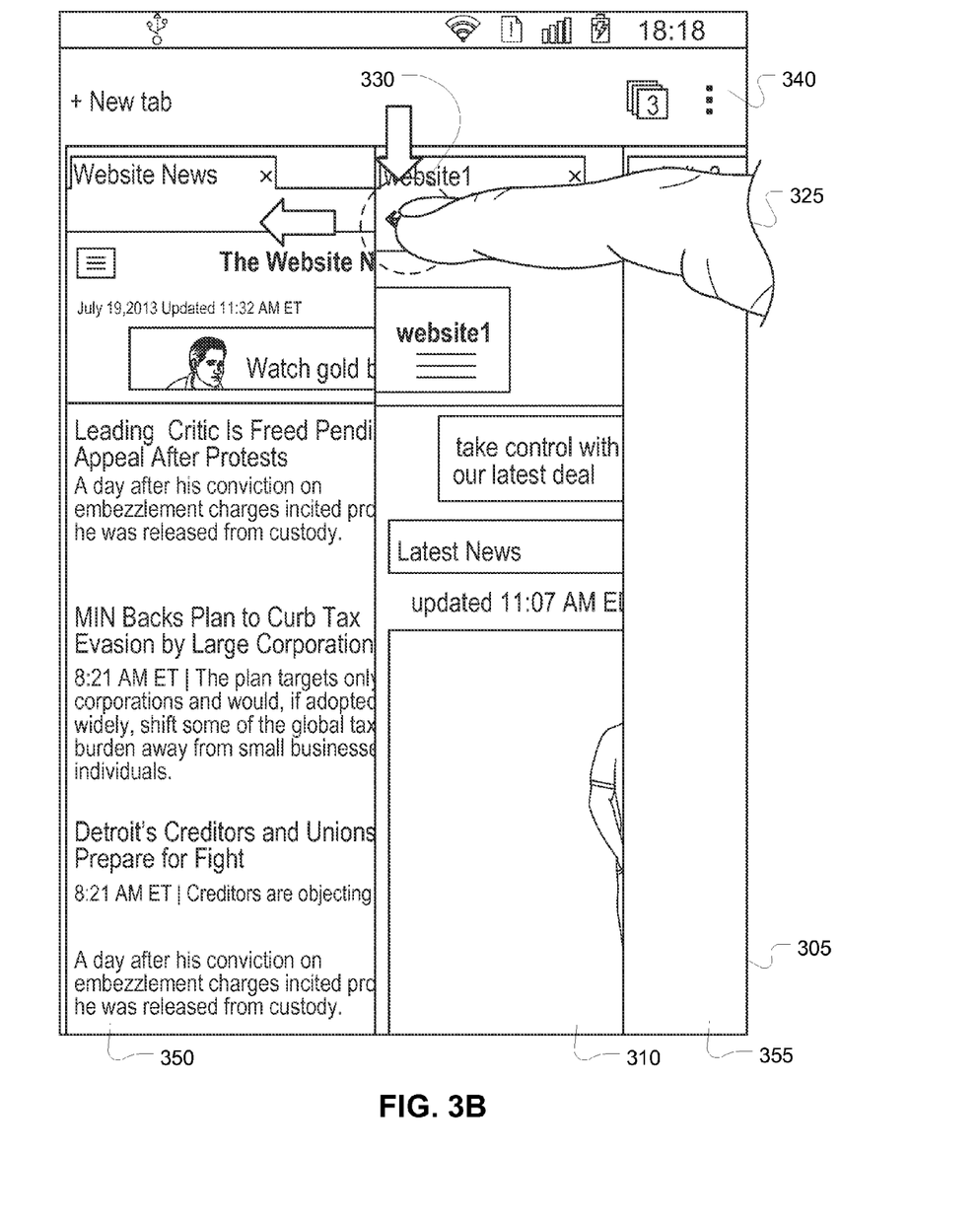
Figure 3C:
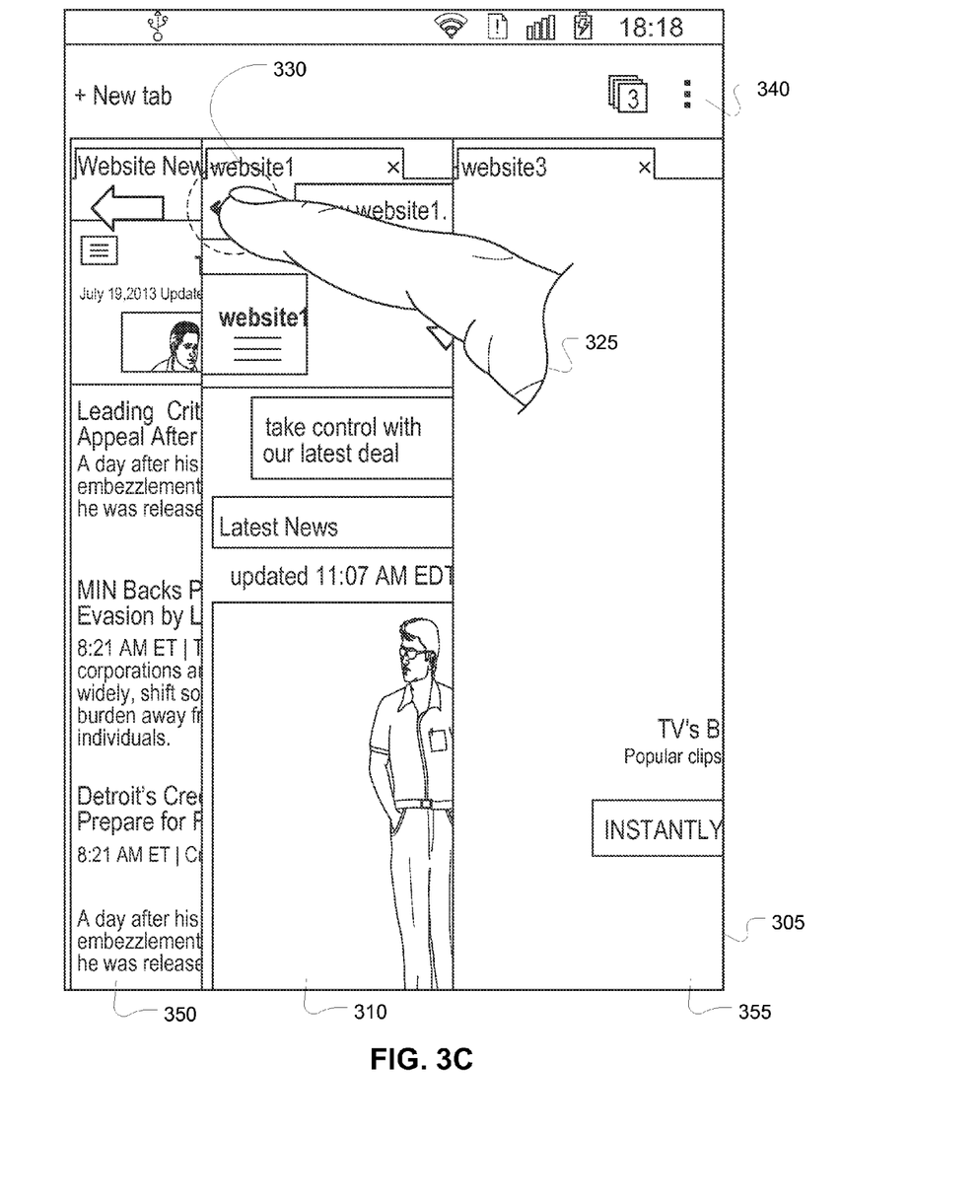

FIG. 3A shows an application interface 305 in the form of a web browser displayed on a touch screen. The application interface 305 may belong to an application in which multiple tabs are open, however only the content of one tab 310 is shown in the application interface 305.

A toolbar 315 is displayed in the application interface 305 and is configured to receive and display the location or source of the content loaded in the displayed tab 310. For example, in FIG. 3A, the toolbar 315 is an address toolbar for the web browser that displays a uniform resource locator (URL) field. In particular, the address toolbar indicates that the content for the currently active tab 310 is from the URL "www.website1.com." However, in other aspects, other toolbars may be used.

A user may initiate a swipe gesture 330 on the touch screen with a finger 325 and dragging the finger 325 in a direction perpendicular to the length of the toolbar 315. In FIG. 3A, this direction is shown as a downward direction. As the swipe gesture continues in FIG. 3B, the tab switching module 130 may enter a tab switching mode in which a tab switching interface is displayed. The address toolbar 315 (covered by the user's finger 325 in FIG. 3B) is dragged downward along with the content loaded in the tab 310 and as the address toolbar 315 and the content loaded in tab 310 are dragged downward, a previously unseen tab utility interface 340 may appear in the application interface 305. The tab utility interface 340 may include interface elements configured to enable a user to add a new tab, view how many tabs are open in the application, open a tab selection interface, or perform other functions associated with the tabs open in the application.

The tab switching module 130 may also enter a tab switching mode and a tab switching interface may be displayed in the application interface 305. The tab switching interface enables a user to view tabs that are open in the application and to select a tab to view. In some variations, a preview of the contents of one or more tabs may be shown in the tab switching interface.

For example, in FIG. 3B, a tab switching interface is displayed in the application interface 305. The tab switching interface includes a visual representation of the tabs that are open in the application (e.g., tabs 310, 350, and 355) and, in particular, a preview of the contents of each tab. The tab switching interface is configured as a series of cards that may be "shuffled" through as the user continues his scroll gesture or makes new scroll gestures. The tab switching interface may show the open tabs as a deck of cards that may be scrolled through horizontally, however, in other aspects, other visual representations of the open tabs may also be used.

When the tab switching interface is displayed in the application interface 105, the tab switching module 130 may receive additional input (e.g., touch input) to scroll through open tabs or a user selection of a tab that the user would like to switch to. For example, as seen in FIG. 3C, the user may continue his swipe gesture, but change the direction of the swipe gesture to go either left or right to scroll through available tabs or make new horizontal swipe gestures (e.g., in a left or right direction) to scroll through available tabs. To select a tab, the user may tap or double tap the desired tab. In response to receiving the user selection, the tab switching module 130 may exit the tab switching mode and cause the contents of the selected tab to be displayed in the application interface 305.

According to some aspects, the address bar may follow the path of the swiping gesture and remain attached to the tab that was displayed in the application interface 305 when the swipe gesture was initiated. A user may also change directions of the swipe gesture to exit the selection interface.

For example, if the user does not wish to switch tabs, the user may bring the swipe gesture up to place the address bar back to its previous position at the top of the display position.

Figure 4:
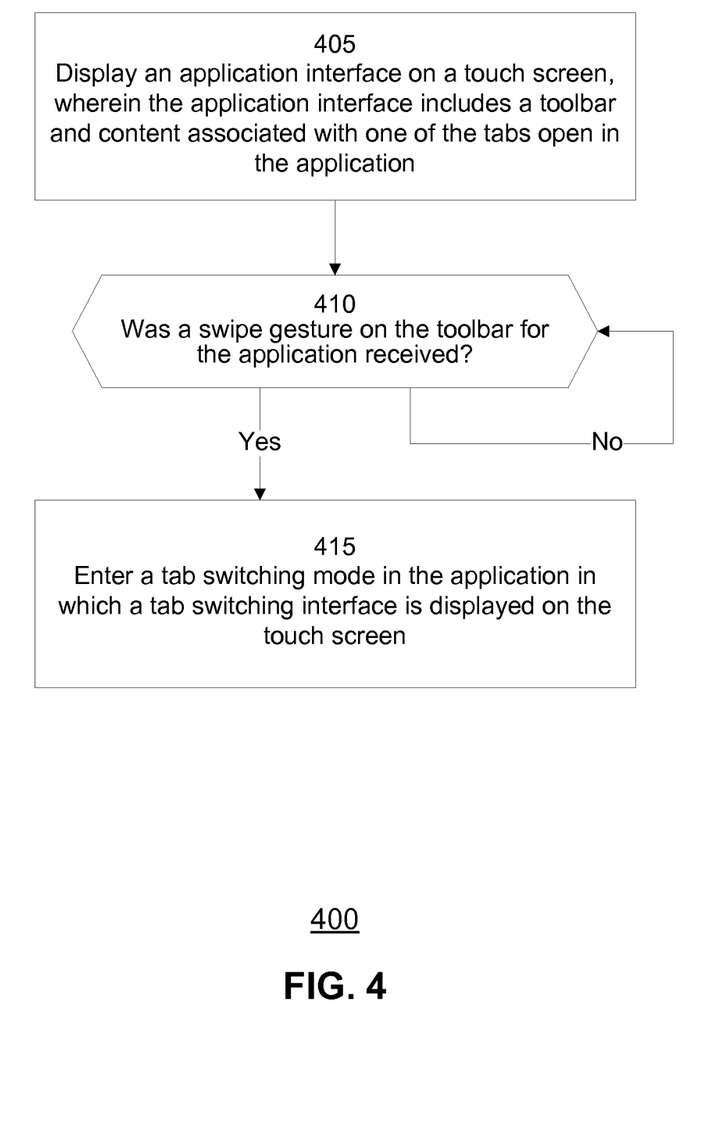
FIG. 4 is a flowchart illustrating an example process for entering a tab switching mode, in accordance with various aspects of the subject technology.

FIG. 4 is a flowchart illustrating an example process 400 for entering a tab switching mode, in accordance with various aspects of the subject technology. Although the steps in FIG. 4 may be discussed with respect to the components of computing device 100 illustrated in FIG. 1, the steps are not limited to these components. Furthermore, although the steps are shown in one particular order, other orderings of steps are also possible. For example other orderings may include additional steps, fewer steps, or steps that occur in parallel.

At block 405, the display interface 110 may provide for the displaying of an application interface on a display device, such as a touch screen. Although the application that the application interface belongs to may have multiple tabs open, only the content of one of the tabs is displayed in the application interface along with a toolbar (e.g., an address toolbar) configured to receive a swipe gesture.

The input interface 120, at block 410, may determine whether a swipe gesture on the toolbar has been received by an input device, such as the touch screen. If no swipe gesture is received, the input interface 120 may continue to monitor input signals from the touch screen. If a swipe gesture is detected, at block 415, the tab switching module 130 may enter a tab switching mode in the application. In the tab switching mode, a tab utility interface may be displayed in the application interface. The tab utility interface may be, for example, an additional tab toolbar that allows a user to add a new tab, view how many tabs are open in the application, open a tab selection interface, or perform other functions associated with the tabs open in the application.

During the tab switching mode, a tab switching interface may also be displayed. The tab switching interface may allow the user to view and select one of the tabs open in the application. Once a selection of a tab is made, the tab switching module 130 may exit the tab switching mode and replace the tab switching interface displayed in the application interface with the content of the selected tab.

According to some aspects, when a swipe gesture on a touch screen is received, the input interface 120 may determine whether the location of the swipe gesture corresponds to the location of the address toolbar in the application interface. If the swipe gesture corresponds to the location of the address toolbar, the input interface 120 may determine one or more swipe characteristics such as a swipe direction or how long the swipe gesture is. The tab switching module 130 may then use the swipe characteristics to determine whether the tab utility interface, the tab switching interface, or both interfaces are to be displayed. The input interface 120 may further be configured to detect any additional user inputs in the tab utility interface, the tab switching interface, or both interfaces.

Figure 5:
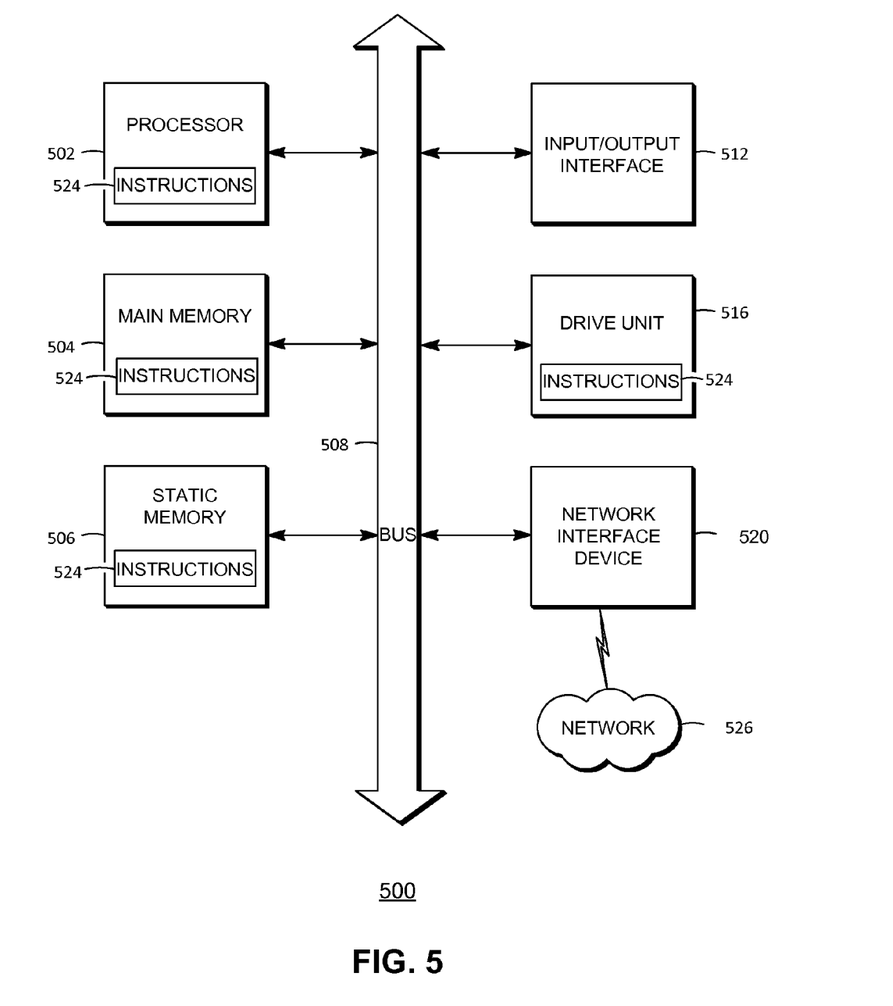
FIG. 5 is a block diagram illustrating an example computer system 500 with which any of the computing devices described herein may be implemented.

FIG. 5 is a block diagram illustrating an example computer system 500 with which any of the computing devices described herein may be implemented. In certain aspects, the computer system 500 may be implemented using hardware or a combination of software and hardware, either in a dedicated server, or integrated into another entity, or distributed across multiple entities.

The example computer system 500 includes a processor 502, a main memory 504, a static memory 506, a disk drive unit 516, and a network interface device 520 which communicate with each other via a bus 508. The computer system 500 may further include an input/output interface 512 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 502 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 524 embodying any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media. The instructions 524 may further be transmitted or received over a network 526 via the network interface device 520.

The machine-readable medium may be a single medium or multiple media (e.g., a centralized or distributed database, and/or associated caches and servers) that store the one or more sets of instructions. The machine-readable medium may comprise the drive unit 516, the static memory 506, the main memory 504, the processor 502, an external memory connected to the input/output interface 512, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system.

Skilled artisans may implement the described functionality in varying ways for each particular application. For example, the modules may include software instructions encoded in a medium and executed by a processor, computer hardware components, or a combination of both. The modules may each include one or more processors or memories that are used to perform the functions described below. According to another aspect, the various systems and modules may share one or more processors or memories. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

What is claimed is:

1. A computer-implemented method, comprising:
    displaying an application interface on a touch screen, the application interface comprising an address toolbar and content associated with a first tab from a plurality of tabs open in a web client application, the address toolbar being configured to receive or display a uniform resource locator (URL);
    receiving, on the touch screen, a swipe gesture on the address toolbar for the web client application;
    visually dragging, in response to the receiving of the swipe gesture, the address toolbar and the content in a direction of the swiping gesture; and
    displaying on the touch screen as the address toolbar is visually dragged, based on the swipe gesture and visually dragging the address toolbar, a tab switching interface comprising a visual representation of at least a portion of the plurality of tabs with corresponding selectable components, and a tab utility interface adjacent to the visual representation,
    wherein the tab utility interface comprises one or more visual elements for performing one or more tab-related actions including adding a new tab and indicating a number of the plurality of tabs open in the web client application.

2. The computer-implemented method of claim 1, wherein the web client application is a web browser.

3. The computer-implemented method of claim 1, further comprising:
    receiving a user selection of a selectable component corresponding to a second tab;
    displaying, in response to the receiving of the user selection, content for the second tab corresponding to the selectable component.

4. The computer-implemented method of claim 3, wherein the user selection is a touch-interaction in the tab switching interface.

5. The computer-implemented method of claim 1, further comprising:
    receiving an additional swipe gesture in the tab switching interface; and
    scrolling, in response to the receiving of the additional swipe gesture, through the selectable components in the tab switching interface.

6. The computer-implemented method of claim 5, wherein the additional swipe gesture is a horizontal swipe gesture.

7. The computer-implemented method of claim 5, wherein the additional swipe gesture is a continuation of the swipe gesture received on the address toolbar for the application.

8. The computer-implemented method of claim 1, wherein the swipe gesture is a vertical swipe gesture configured to drag the address toolbar downward.

9. A system, comprising:
    one or more processors; and
    a machine-readable medium comprising instructions stored therein, which when executed by the one or more processors, cause the one or more processors to perform operations comprising:
        providing for display an application interface on a touch screen, the application interface comprising an address toolbar and content associated with a first tab from a plurality of tabs open in a web client application, the address toolbar being configured to receive or display a uniform resource locator (URL);
        receiving, via an input device, a swipe gesture on the address toolbar in the application interface;
        visually dragging, in response to the receiving of the swipe gesture, the address toolbar and the content in a direction of the swiping gesture; and
        displaying on the touch screen as the address toolbar is visually dragged, based on the swipe gesture and visually dragging the address toolbar, a tab switching interface comprising a visual representation of at least a portion of the plurality of tabs with corresponding selectable components, and a tab utility interface adjacent to the visual representation,
        wherein the tab utility interface comprises one or more visual elements for performing one or more tab-related actions including adding a new tab and indicating a number of the plurality of tabs open in the application.

10. The system of claim 9, wherein the input device is a touch screen and the application interface is displayed on the touch screen.

11. The system of claim 9, wherein the application is a web browser.

12. The system of claim 9, wherein the operations further comprise:
    receiving a user selection of a selectable component corresponding to a second tab;
    displaying, in response to the receiving of the user selection, content for the second tab corresponding to the selectable component.

13. The system of claim 9, wherein the operations further comprise:

receiving an additional swipe gesture in the tab switching interface; and scrolling, in response to the receiving of the additional swipe gesture, through the selectable components in the tab switching interface.

14. A non-transitory machine-readable medium comprising instructions stored therein, which when executed by a machine, cause the machine to perform operations comprising:

displaying a browser interface on a touch screen, the browser interface comprising an address toolbar and content associated with a first tab from a plurality of tabs open in a web browser, the address toolbar being configured to receive or display a uniform resource locator (URL);

receiving, on the touch screen, a swipe gesture on the address toolbar in the browser interface;

visually dragging, in response to the receiving of the swipe gesture, the address toolbar and the content in a direction of the swiping gesture; and displaying on the touch screen as the address toolbar is visually dragged, based on the swipe gesture and visually dragging the address toolbar, a tab switching interface comprising a visual representation of at least a portion of the plurality of tabs with corresponding selectable components, and a tab utility interface adjacent to the visual representation, wherein the tab utility interface comprises one or more visual elements for performing one or more tab-related actions including adding a new tab and indicating a number of the plurality of tabs open in the browser interface.

15. The non-transitory machine-readable medium of claim 14, wherein the operations further comprise:

receiving a user selection of one of the selectable components corresponding to a second tab;

displaying, in response to the receiving of the user selection, content for the second tab.

16. The non-transitory machine-readable medium of claim 14, wherein the operations further comprise:

receiving an additional swipe gesture in the tab switching interface; and scrolling, in response to the receiving of the additional swipe gesture, through the selectable components in the tab switching interface.

* * * * *